Nov. 9, 1965     W. J. KRUPICK ETAL     3,217,198
PERMANENT MAGNET FIELD WINDING INCLUDING AN INTEGRAL
MAGNETIZING WINDING AND METHOD OF ASSEMBLY
Filed Sept. 18, 1962

WALTER J. KRUPICK
HERBERT BINDER
INVENTORS

BY S. A. Giarratana
George B. Oujevolk
attorneys

United States Patent Office 3,217,198
Patented Nov. 9, 1965

3,217,198
PERMANENT MAGNET FIELD WINDING INCLUDING AN INTEGRAL MAGNETIZING WINDING AND METHOD OF ASSEMBLY
Walter J. Krupick, Franklin, and Herbert Binder, New Monmouth, N.J., assignors to General Precision Inc., Little Falls, N.J., a corporation of Delaware
Filed Sept. 18, 1962, Ser. No. 224,438
4 Claims. (Cl. 310—155)

The present invention relates to magnetizing windings for permanent magnet field structures, and more particularly to a combined magnetizing winding and permanent magnet field structure for use in gyroscope torquers and the like.

Previously permanent magnet torquers or generators were handled in one of the three following manners: the permanent magnet field structures were magnetized before final assembly and inserted into the final assembly "open circuited"; the permanent magnet field structures were magnetized before assembly and inserted into the final assembly "close circuited"; or magnet wire was wrapped around the field assembly and leads were brought out to the exterior of the unit after final assembly so that the field could be magnetized by passing current through the magnet wire, the magnet wire then being removed or else left in the assembly.

The first two methods resulted in a lower degree of magnetization of the field structures with the resultant loss of efficiency. The third method was unsatisfactory because it often was not mechanically feasible to wrap the magnets with wire because of space and end turn limitation and wrapping the magnets with one turn of a heavy guage conductor was not feasible because of space and forming considerations. Wrapping the magnets with many turns of a small gauge magent wire was not too feasible because the high voltages encountered during magnetization could cause turn to turn breakdown, and because it was difficult to wind a sufficient number of turns to match the impedance of the magnetizer. Also the wire-wrapped assemblies were not too sound mechanically.

Accordingly, it is one object of the present invention to provide an improved magnetizing winding for a permanent magnet field structure.

It is another object of the invention to provide a combined magnetizing winding and permanent magnet field assembly having greater structural integrity.

It is a further object of the invention to provide a magnetizing winding and permanent field magnet assembly which enables a higher final assembly efficiency to be realized.

It is a still further object of the invention to provide a magnetizing winding for a permanent magnet field assembly which occupies otherwise lost space in the assembly.

It is a still further object of the invention to provide a magnetizing winding for a permanent magnet field assembly which retains the magnets in oriented relation without elaborate positioning fixtures, the unit being essentially self-jigging.

It is a still further object of the invention to provide a cast or machined magnetizing winding for a permanent magnet field structure which positions the magnets and adds structural integrity to the final assembly.

Further objects and advantages of the present invention will be specifically pointed out or will otherwise become apparent when referring, for a better understanding of the invention, to the following description taken in conjunction with the accompanying drawings, wherein.

Figure 1:
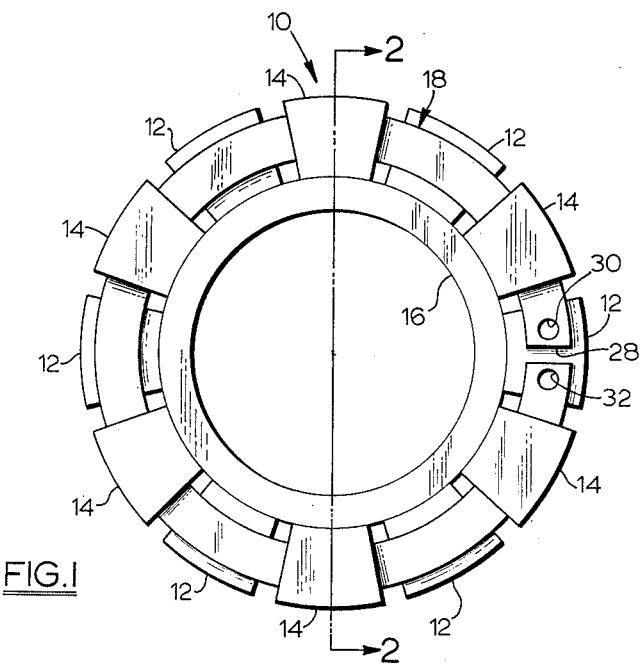
FIG. 1 is a plan view of a combined magnetizing winding and permanent magnet field structure embodying features of the present invention.
Figure 2:
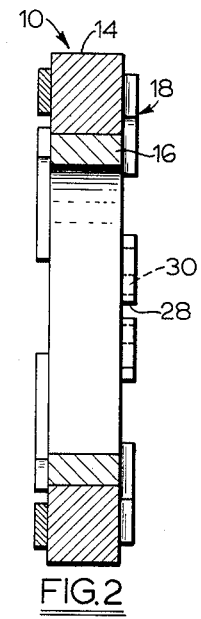
FIG. 2 is a sectional view taken on the line 2—2 of FIG. 1.

Referring to FIGS. 1 and 2, a permanent magnet field assembly is illustrated which embodies features of the present invention. It comprises six circumferentially spaced magnets 12 having their north poles radially outwardly disposed, and six magnets 14 having their south poles radially outwardly disposed. The inner arcuate edges of each of the magnets are soldered or cemented to a ring 16 of magnetic permeable material to provide a return path, and each of the magnets is accurately positioned about the ring by a cast or machined magnetizing winding 18.

Figure 3:
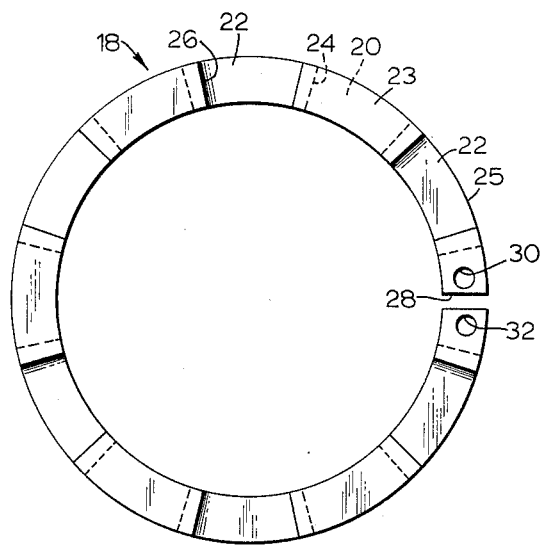
FIG. 3 is a plan view of the magnetizing winding illustrated in FIG. 1.
Figure 4:
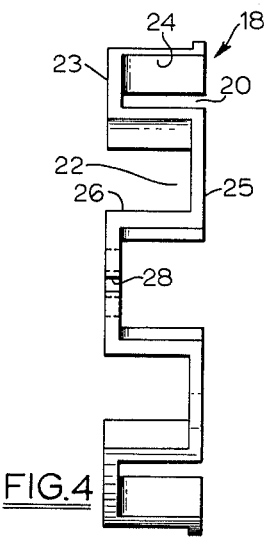
FIG. 4 is a side view of the magnetizing winding illustrated in FIG. 3.

Referring specifically to FIGS. 3 and 4, the magnetizing winding 18 is made of an electrically conductive, non-magnetic material, such as anodized aluminum, which is shaped to provide a plurality of alternately disposed, truncated segmental recesses 20 and 22 for receiving and positioning eahc of the magnets 12 and 14. As viewed in FIG. 3, the recesses 20 face in an axial direction into the plane of the figure, and the recesses 22 face in the opposite axial direction. Each of the recesses 20 is bounded by a truncated segmental wall 23 and substantially radially disposed walls 24, and each of the recesses 22 is bounded by a truncated segmental wall 25 and substantially radially disposed walls 26. Parallel sided magnets may also be used however. The magnets 12 and 14 have a similar truncated segmental shape with the tapered side walls thereof disposed at the same angle relative to one another as the side walls of the recesses in which they are positioned as illustrated in FIGS. 1 and 2. With this construction the magnetizing winding 18 accurately positions the magnets relative to one another with their arcuate inner edges defining a circle having the same diameter as the outside diameter of the ring 16.

The magnetizing winding 18 is split as at 28 and the free ends thereof are provided with threaded apertures 30 and 32 to form terminals which facilitate external electrical connection to the magnetizing winding. The complete assembly 10 may then be assembled into a unit such as a torquer for a gyroscope before the magnets 12 are magnetized. Suitable electrical connections then can be made to the terminals formed by the threaded apertures 30 and 32 to enable current from a magnetizer such as a capacitor discharge, pulse, or other device to be fed to the terminals so that the current passing through the magnetizing winding provides a field of the proper polarity and strength to saturate the magnets 12 and 14. The electrical connections are then removed and the unit is ready for operation.

It is apparent that the cast or machined magnetizing winding 18 improves the assembly efficiency of the unit and adds to its structural integrity to provide a more rugged permanent magnet field assembly. A higher degree of saturation may be imparted to the field structure and the magnetizing winding occupies otherwise lost space. Since the magnets are magnetized in place in the unit in which they are to be used, no keepers are needed and the magnets may be handled in a non-magnetized condition during assembly. And finally, the configuration of the magnetizing winding accurately positions the magnets circumferentially without any elaborate positioning fixtures. Consequently the assembly is, in effect, self-jigging.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims. For example, although the construction shown in FIG. 1 is for an internal field, it is apparent that the same construction may be utilized for an external field.

What is claimed is:
1. A permanent magnet field structure consisting of:
a ring of magnetically permeable material;
a plurality of permanently magnetizable, radially-outwardly extending pole pieces bonded to the outer circumferential surface of said ring at substantially equi-angularly spaced intervals; and
a magnetizing element formed of a single ribbon of conductive material interwound about said pole pieces, all major surfaces of said ribbon lying in respective planes radiating from the central axis of said ring and planes perpendicular to said axis, said element being a monolithic rigid structure preformed in an annular configuration, radially split at one point on its circumference and convoluted about its entire circumference to receive said pole pieces.

2. A permanent magnet field structure according to claim 1 wherein said pole pieces are in the form of truncated circular segments.

3. A magnetizing element for a permanent magnet field structure consisting of a ribbon of conductive material forming a rigid annulus radially split at one point to provide electrical terminal connections, said annulus being convoluted about its entire circumference to define a plurality of uniformly spaced recesses alternately facing in opposite axial directions, the major surfaces of said ribbon lying in respective planes radiating from, and perpendicular to, the central axis of said annulus.

4. A method of assembling and energizing a permanent magnet field assembly, comprising:
providing a ring of magnetically permeable material;
arranging a plurality of permanently magnetizable pole pieces about the outer circumference of said ring;
utilizing a rigid annular conductive member interwound about said pole pieces and coacting with said ring to jig said pole pieces;
installing the assemblage of the ring, pole pieces, and conductive member in an electromechanical device requiring a permanent magnet field assembly; and
thereafter passing an electric current through said conductive member to permanently magnetize said pole pieces.

References Cited by the Examiner

UNITED STATES PATENTS

| 1,337,732 | 4/20 | Stroller. | |
| 1,630,757 | 5/27 | Perkins | 310—180 |
| 2,754,440 | 7/56 | Brainard | 317—203 X |

FOREIGN PATENTS

| 234,278 | 5/25 | Great Britain. |

ORIS L. RADER, *Primary Examiner.*

JOHN P. WILDMAN, MILTON O. HIRSHFIELD,
*Examiners.*